(12) United States Patent
Watkin (10) Patent No.: US 10,614,691 B2
(45) Date of Patent: Apr. 7, 2020

(54) COMBINATION MEDIA DISPLAY AND ELECTRONIC ARTICLE SURVEILLANCE PEDESTAL

(71) Applicant: FLASHGATE TECHNOLOGY INC., Surrey (CA)

(72) Inventor: Greg Watkin, Surrey (CA)

(73) Assignee: INEO SOLUTIONS INC. (CA)

( * ) Notice: Subject to any disclaimer, the term of this patent is extended or adjusted under 35 U.S.C. 154(b) by 0 days.

(21) Appl. No.: 16/317,084

(22) PCT Filed: Jul. 10, 2017

(86) PCT No.: PCT/CA2017/000171
§ 371 (c)(1),
(2) Date: Jan. 11, 2019

(87) PCT Pub. No.: WO2018/010007
PCT Pub. Date: Jan. 18, 2018

(65) Prior Publication Data
US 2019/0304279 A1 Oct. 3, 2019

(30) Foreign Application Priority Data
Jul. 11, 2016 (CA) .................................... 2936044

(51) Int. Cl.
*G08B 13/24* (2006.01)
*G09F 23/06* (2006.01)
(Continued)

(52) U.S. Cl.
CPC ......... *G08B 13/2468* (2013.01); *G08B 13/24* (2013.01); *G08B 13/2434* (2013.01);
(Continued)

(58) Field of Classification Search
None
See application file for complete search history.

(56) References Cited

U.S. PATENT DOCUMENTS 4,769,631 A * 9/1988 Copeland ............... G01V 3/104
340/551
5,367,291 A 11/1994 Fokens
(Continued)

FOREIGN PATENT DOCUMENTS

CN 202976111 6/2013

OTHER PUBLICATIONS

Canadian International Searching Authority, International Search Report dated Oct. 10, 2017, International Patent Application No. PCT/CA2017000171, 3 Pages.
(Continued)

*Primary Examiner* — John F Mortell
(74) *Attorney, Agent, or Firm* — Baumgartner Patent Law; Marc Baumgartner (57) ABSTRACT

A combination of a media display and an electronic article surveillance (EAS) detection system is provided for use with an RF security tag, the combination comprising: a base for retaining a power supply, housing a system controller and each of the media display and the EAS such that the media display is proximate the EAS, the media display including a plurality of LCD screens, an at least one electrical line in electrical communication with the power supply and the plurality of LCD screens; the EAS including a transceiver, and an at least one RF antenna that is an emitter and an at least one RF antenna that is a receiver or an at least one RF antenna that is a combination emitter and receiver, the RF antennae in electronic communication with the transceiver; and a physical shield, the physical shield located between at least the plurality of LCD screens and the RF antennae of the EAS detection system.

12 Claims, 8 Drawing Sheets

(51) Int. Cl.
*H01Q 17/00* (2006.01)
*G09F 27/00* (2006.01)
*G09F 9/30* (2006.01)
*H04B 5/00* (2006.01)
*G08B 25/08* (2006.01)

(52) U.S. Cl.
CPC .............. *G08B 25/08* (2013.01); *G09F 9/30* (2013.01); *G09F 23/06* (2013.01); *G09F 27/005* (2013.01); *H01Q 17/00* (2013.01); *H01Q 17/004* (2013.01); *H04B 5/0056* (2013.01)

(56) References Cited

U.S. PATENT DOCUMENTS

| | | | |
|---|---|---|---|
| 2016/0049058 A1 | 2/2016 | Allen | |
| 2017/0069186 A1* | 3/2017 | Perreau | G08B 13/149 |
| 2017/0069202 A1* | 3/2017 | Bergman | G08G 1/052 |
| 2017/0221099 A1* | 8/2017 | Fernandez | H04W 4/70 |

OTHER PUBLICATIONS

Canadian International Searching Authority, Written Opinion of the International Searching Authority dated Oct. 10, 2017, International Patent Application No. PCT/CA2017000171, 6 Pages.
Sensoramtic Advertising Upgrade Kit, p. 184, www.sensormatic.com, 2016.

* cited by examiner

COMBINATION MEDIA DISPLAY AND ELECTRONIC ARTICLE SURVEILLANCE PEDESTAL

CROSS-REFERENCE TO RELATED APPLICATIONS

The present invention is filed under 35 U.S.C. § 371 as the U.S. national phase of International Application No. PCT/CA2017/000171, filed Jul. 10, 2017, which designated the U.S. and claims the benefit of Canadian Patent Application No. 2,936,044, filed Jul. 11, 2016 and entitled COMBINATION MEDIA DISPLAY AND ELECTRONIC ARTICLE SURVEILLANCE PEDESTAL, each of which is hereby incorporated in its entirety including all tables, figures, and claims.

FIELD

The present technology relates to an electronic article surveillance gate that includes media screens. More specifically, the technology is a system that allows a Radio Frequency antenna to function within an array of electro-magnetic interference (EMI) generating devices.

BACKGROUND

Electronic article surveillance (EAS) systems generally comprise an interrogation antenna for transmitting an electromagnetic signal into an interrogation zone, markers which respond in some known electromagnetic manner to the interrogation signal, an antenna for detecting the response of the marker, a signal analyzer for evaluating the signals produced by the detection antenna, and an alarm which indicates the presence of a marker in the interrogation zone. The alarm can then be the basis for initiating one or more appropriate responses depending upon the nature of the facility. Typically, the interrogation zone is in the vicinity of an exit from a facility such as a retail store, and the markers can be attached to articles such as items of merchandise or inventory.

An example of an electronic article surveillance system is found in US Publication Number 20160049058, where systems and methods for detecting a location of an EAS security tag are disclosed. The methods involve: determining a first amplitude of a response signal generated by the EAS security tag and received at a first pedestal, and a second amplitude of the response signal received at a second pedestal; processing the first and second amplitudes to determine whether the EAS security tag resides within a specified distance range of the first or second pedestal, a detection zone of an EAS detection system, or a backfield of the EAS detection system; issuing an alarm when the EAS security tag is determined to reside within the specified distance range of the first/second pedestal or the detection zone of the EAS detection system; and preventing issuance of the alarm when the EAS security tag is determined to reside in the backfield of the EAS detection system. Acoustomagnetic (AM), Radio Frequency (RF) type tags and Radio Frequency Identification (RFID) EAS systems are contemplated. This system does not exploit the pedestal real-estate for advertising to customers.

An example of a combining advertising with an EAS can be found at http://www.sensormatic.com/ where it is stated, "Advertising Upgrade Kit leverages valuable pedestal real estate at the entrance to reach shoppers on-the-move. The easy-to-install poster helps draw shoppers with advertisements, modern designs or simple, low-cost printed graphics. This add-on also provides an opportunity to generate additional marketing co-op profit by bidding out this valuable advertising space to vendors." While this system utilizes the real-estate of the pedestal, it provides only a static form of advertising.

What is needed is a system that combines digital advertising with EAS in a pedestal. The system would preferably allow for at least one liquid crystal display (LCD) and up to a plurality of LCDs on each outer wall of the pedestal. The system would preferably shield, either physically, or electronically, the antenna of the EAS from the electro-magnetic radiation from the LCDs, so as to not interfere with the antenna's detection capability.

SUMMARY

The present technology is a system that combines digital advertising with EAS in a pedestal. The system allows for at least one liquid crystal display (LCD) and up to a plurality of LCDs on each outer wall of the pedestal. The system shields, either physically, or electronically, the antenna of the EAS from the electro-magnetic radiation from the LCDs, so as to not interfere with the antenna's detection capability. Thus, a non-interfering combined digital advertising and EAS system is provided.

In one embodiment, a combination of a media display and an electronic article surveillance (EAS) detection system is provided for use with an RF security tag, the combination comprising: a base for retaining a power supply and each of the media display and the EAS such that the media display is proximate the EAS, the media display including a plurality of LCD screens, an at least one electrical line in electrical communication with the power supply and the plurality of LCD screens; the EAS including a transceiver, and an at least one RF antenna that is an emitter and an at least one RF antenna that is a receiver or an at least one RF antenna that is a combination emitter and receiver, the RF antennae in electronic communication with the transceiver; and a physical shield, the physical shield located between at least the plurality of LCD screens and the RF antennae of the EAS detection system.

The combination may further comprise the system controller, the system controller housed within the base.

In the combination the EAS may be within an interference zone.

In another embodiment, a combination of a media display and an electronic article surveillance (EAS) detection system for use with a security tag and a system controller is provided, the combination comprising: a base for retaining a power supply and each of the media display and the EAS such that the EAS is within an interference zone, the media display including an at least one electronic screen, and an at least one electrical line, the electrical line in electrical communication with the power supply and the at least one electronic screen; the EAS including a transceiver, and an at least one antenna that is an emitter and an at least one antenna that is a receiver or an at least one antenna that is a combination emitter and receiver, the antennae in electronic communication with the transceiver; and a physical or electronic shield configured to shield the antennae from the at least one electronic screen.

In the combination, the shield may be a physical shield.

In the combination, the physical shield may be located between the antennae and both the at least one electronic screen and the at least one electrical line.

In the combination, the antennae may be radio frequency (RF) antennae.

In the combination, the physical shield may be a magnetic shield.

In the combination, the magnetic shield may be a copper shield.

The combination may further comprise the system controller and the alarm, the system controller integrated into the base.

The combination may comprise a plurality of electronic screens.

In the combination, the plurality of electronic screens may be liquid crystal display (LCD) screens.

In the combination, the shield may be an electronic shield.

In the combination, the electronic shield may be controlled by a processor under instructions from a memory.

In another embodiment, a method of displaying electronic media on an EAS is provided, the method comprising: providing a combination comprising an EAS and media display, the combination including a physical or electronic shield; and displaying electronic media on the media display.

The method may further comprise detecting a security tag at the EAS.

In the method, the security tag may be an RF security tag.

In the method, the media may be static.

In the method, the media may be streaming.

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting.

Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Interference zone—in the context of the present technology, the interference zone is the zone within which an RF tag emitting at a radio frequency of 8.2 MegaHertz (MHz) will have the radio signal interfered with by an electro-magnetic emitting device, which may be, but is not limited to a television, a computer monitor, digital signage, or media screen (generally referred to as an electronic screen), and operating within the interrogation zone of the EAS transceiver.

Proximate—in the context of the present technology, proximate means no further than about 60 cm apart.

DETAILED DESCRIPTION

Figure 1:
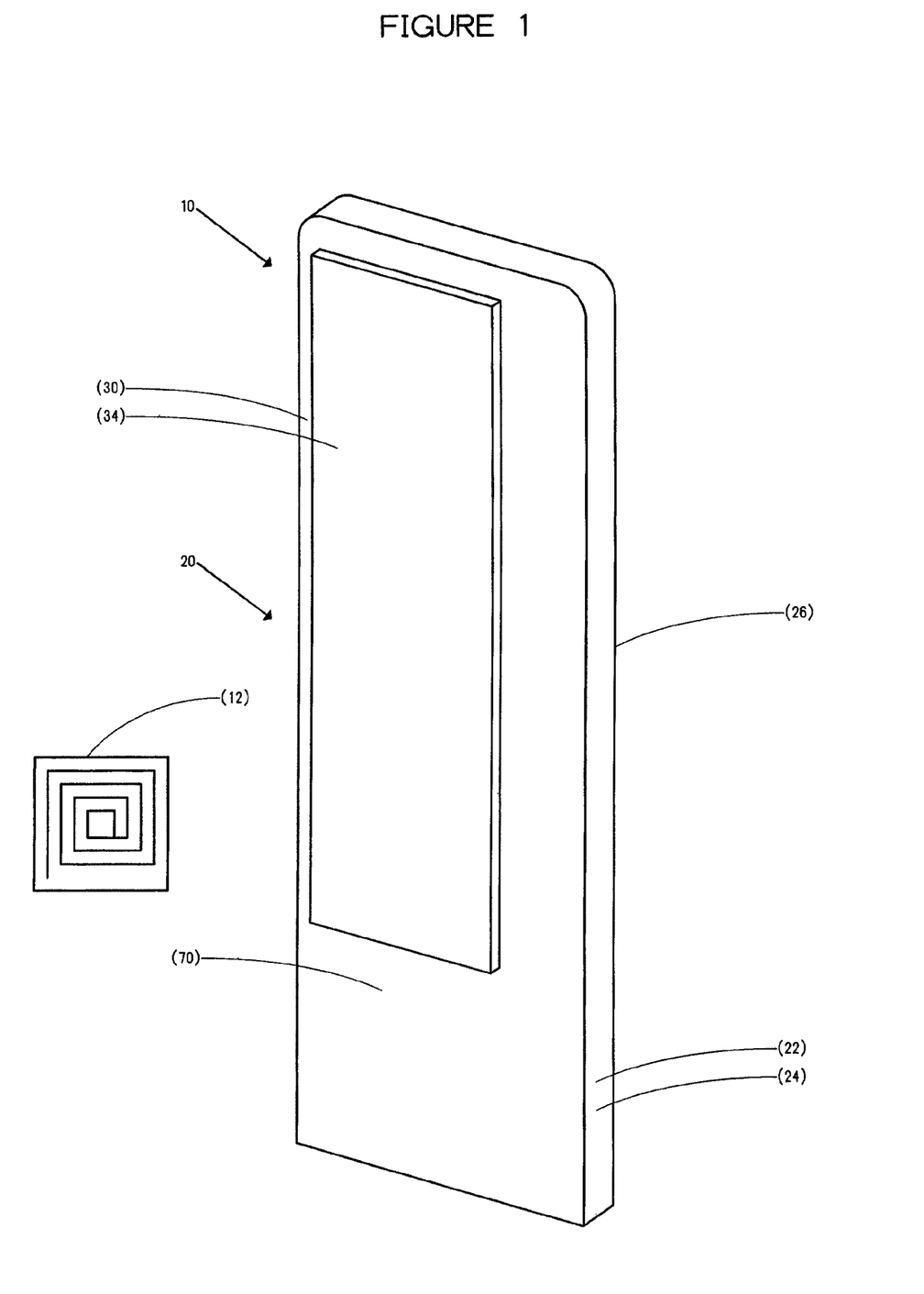
FIG. 1 is a schematic of combination media display and EAS detection system of the present technology.
Figure 5:
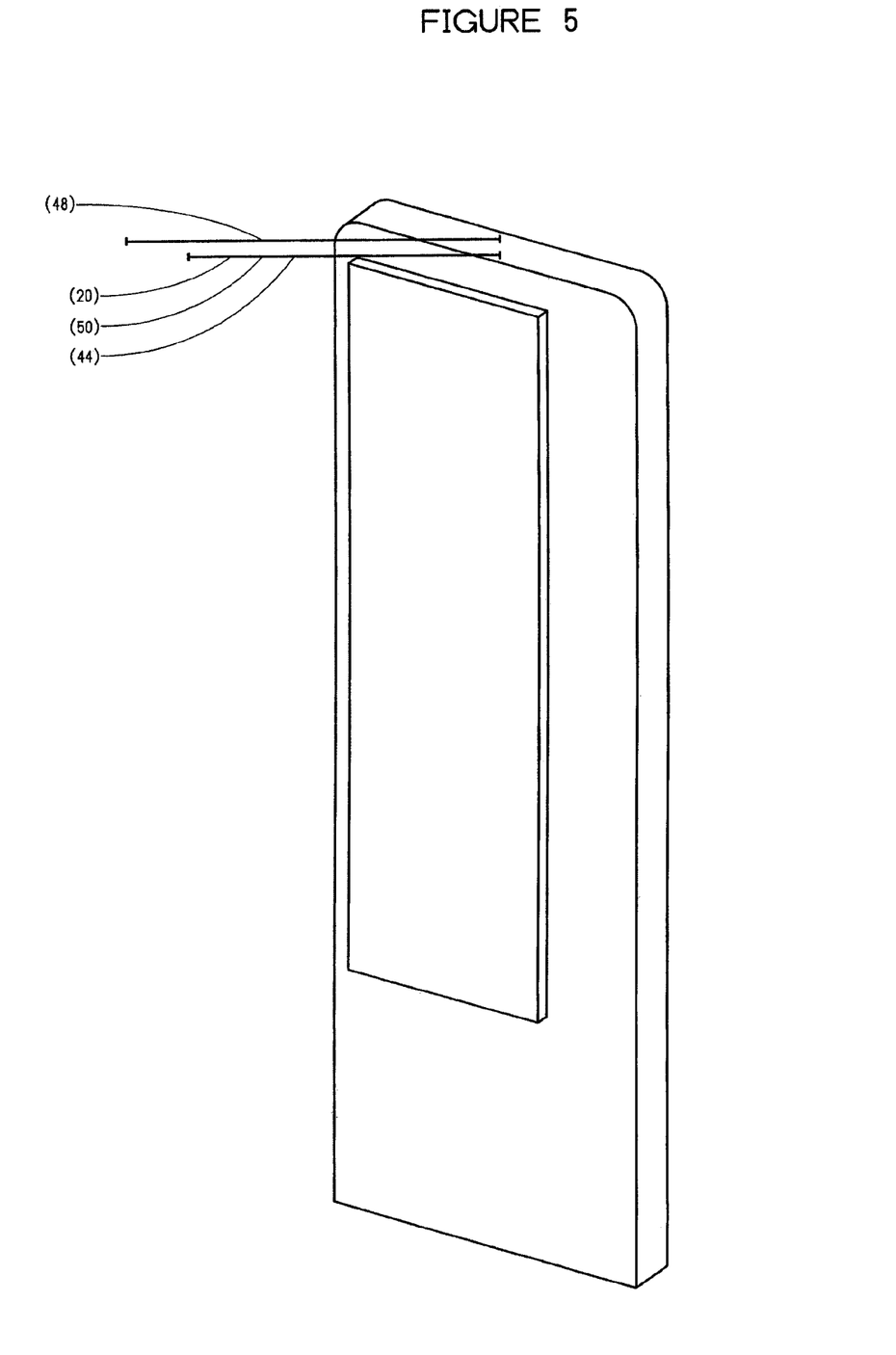
FIG. 5 is a schematic of the fields and the zones of the present technology.

A combination media display and EAS detection system, generally referred to as 10 is shown in FIG. 1. It is for locating proximate a store exit. The combination 10 detects security tags 12 which are Radio Frequency (RF) type tags. The security tags 12 are detected when they are within the EAS detection zone, generally referred to as 20. A pedestal 22 has a base 24 that supports both a detection system frame 26 and a media display frame 30. The media display frame 30 retains at least one screen 34, which in the preferred embodiment is a liquid crystal display (LCD) or plasma screen, which may be, for example, but not limited to a computer monitor, digital signage or a television. In one embodiment, the media display frame 30 is spaced apart from the detection system frame 26 by about 60 cm. In another embodiment shown in FIG. 2, a first edge 38 of the media display frame 30 abuts the detection system frame 26 and the frame 30 is angled away from the detection system 32 at an angle 40 of about 45 degrees. In another embodiment, shown in FIG. 3, the frame 30 is again angled away from the detection system frame 26, but instead of the first edge 34 abutting the detection system 32, a small section of the rear side 42 abuts the detector system 32, again defining an angle 40 with the detector system frame 32. The positioning of the two frames 26, 30 may be static or may be adjustable, however, the two frames are retained by the base 24 and are therefore no further away from one another than about 60 cm. In other words, they are within an interference zone 44 (see FIG. 5) where the electromagnetic radiation or any other interference, such as, but not limited to electrical noise from the screens, power supplies, power cords and the like would normally interfere with the radio waves of the detector system, absent electronic or physical mitigation. As would be known to one skilled in the art, there is a main field 48, which includes the detection zone 20, and a back field 50, as shown in FIG. 5. The interference zone 44 is shown superimposed on the fields 48, 50.

Figure 2:
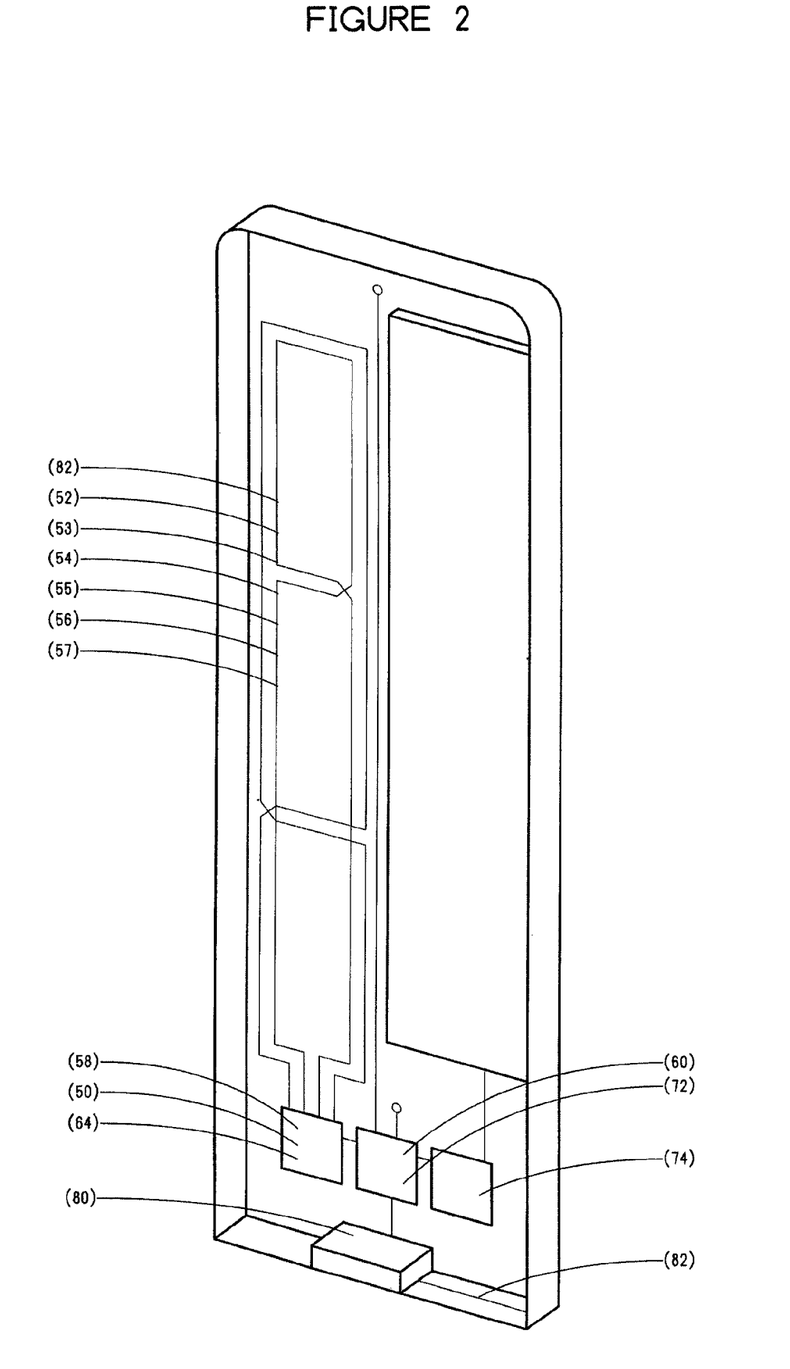
FIG. 2 is s schematic of a longitudinal sectional view of the technology of FIG. 1.
Figure 3:
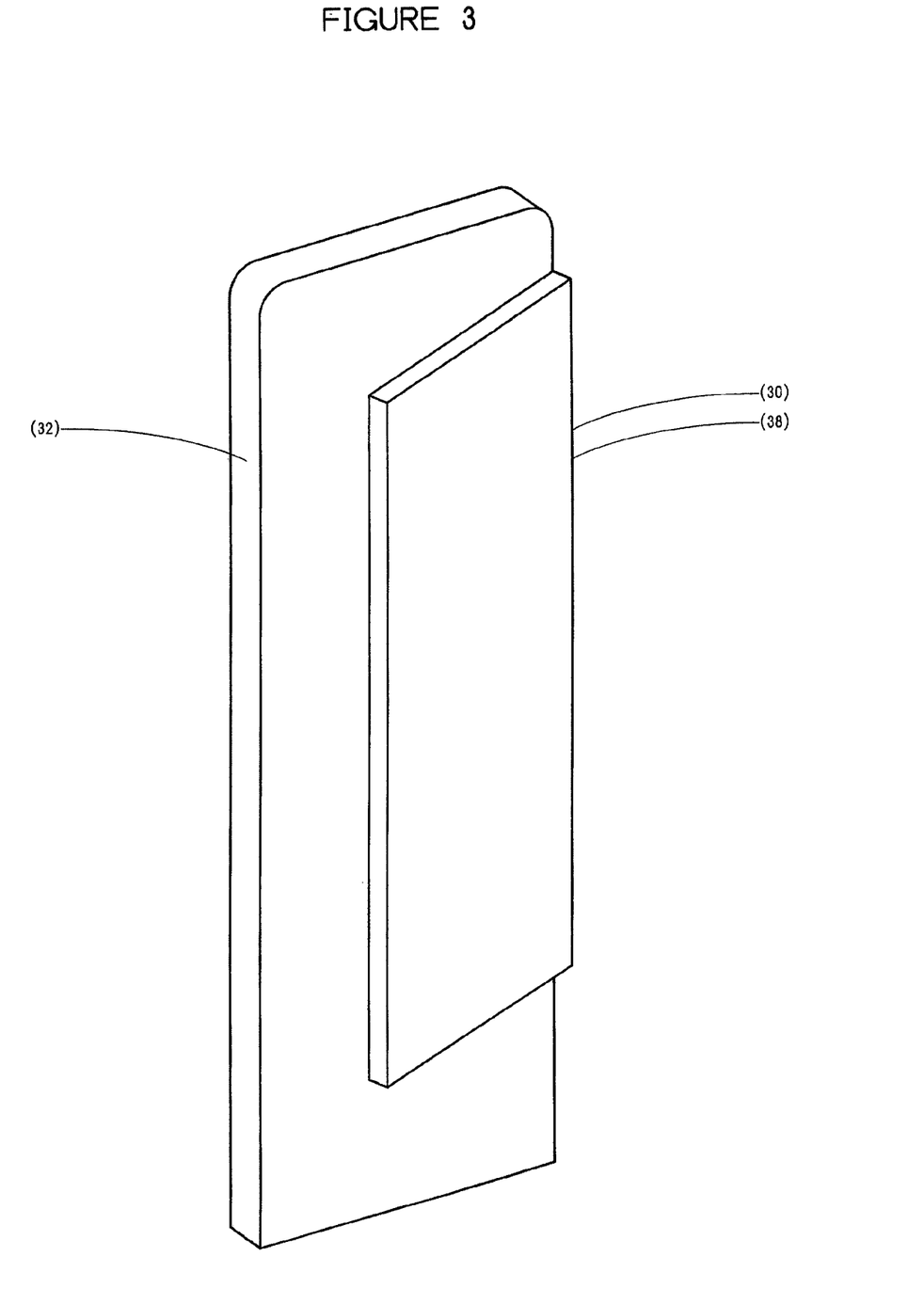
FIG. 3 is a schematic of an alternative embodiment of the technology of FIG. 1.
Figure 4:
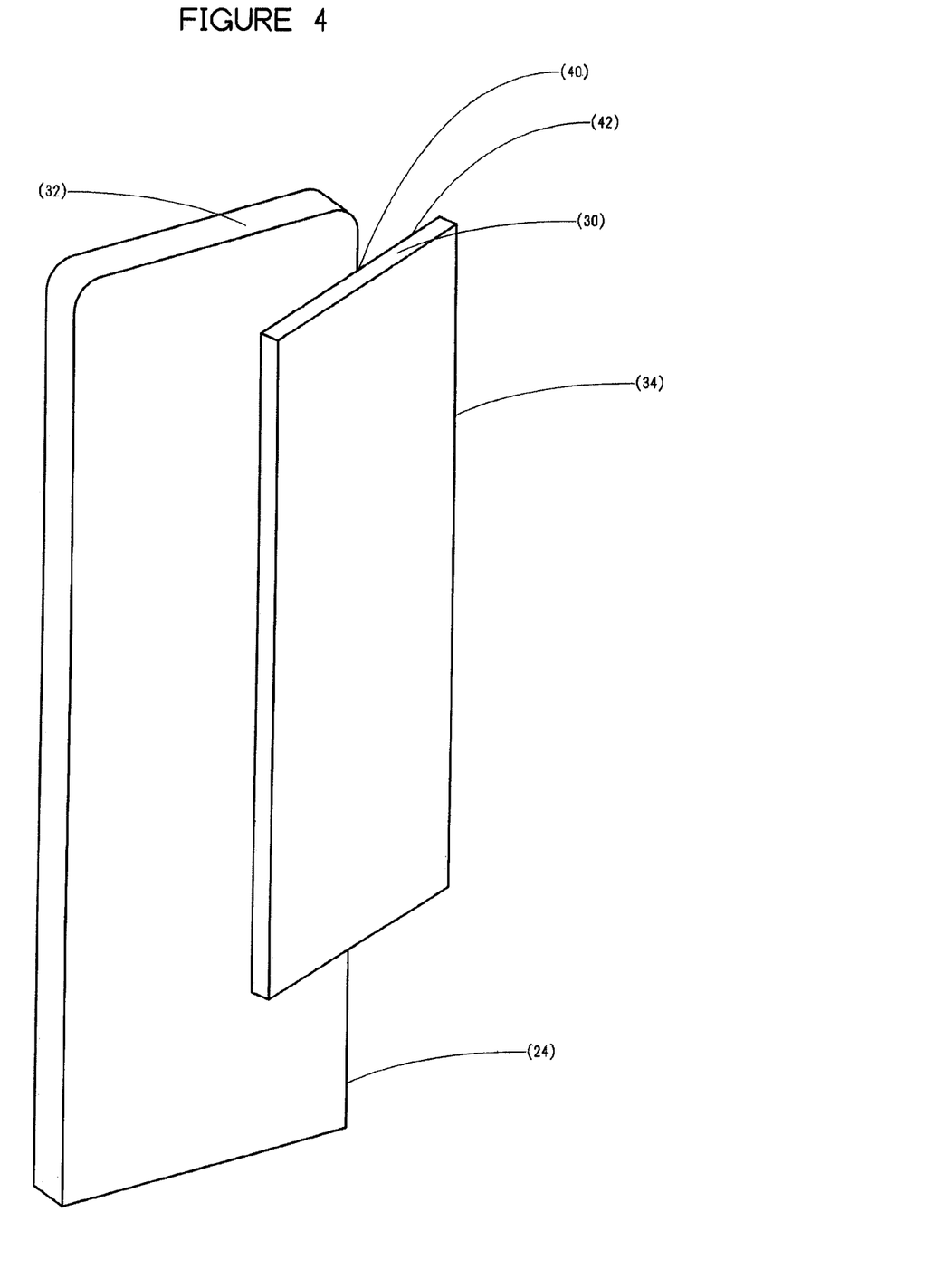
FIG. 4 is a schematic of yet another alternative embodiment of the technology of FIG. 1.

Returning to FIG. 1, the screens 34 are mounted on the frame 30 on its face 44. As shown in FIG. 2 the detection system 50 includes at least one RF antenna 52 that is an emitter 53 and at least one RF antenna 54 that is a receiver 55 or at least one RF antenna 56 that is a combination emitter and the receiver 57. The antenna 52, 54, 56 are in electronic communication with a transceiver 58. A system controller 60 is in electronic communication with the detection system 50. The system controller 60 may be integrated into the base 24, as shown or may be remote. The system controller 60 is in electronic communication with an alarm 64. The electronic communication is either wired or wireless.

The base 24 has a protective cover 70 and a digital signal processor 72 housed therein. Also housed within the protective cover 70 is a networking module and display driver 74. In an alternative embodiment, one or more of the processor 72 and the networking module and display driver 74 are remote to the combination 10. Regardless of location, the processor 72 and the networking module and display driver 74 are in electronic communication with the screen 34. A power supply (which may be a power plug) 80 and power electrical lines 82 are housed within the base and are routed through or on the media display frame 30.

Figure 6:
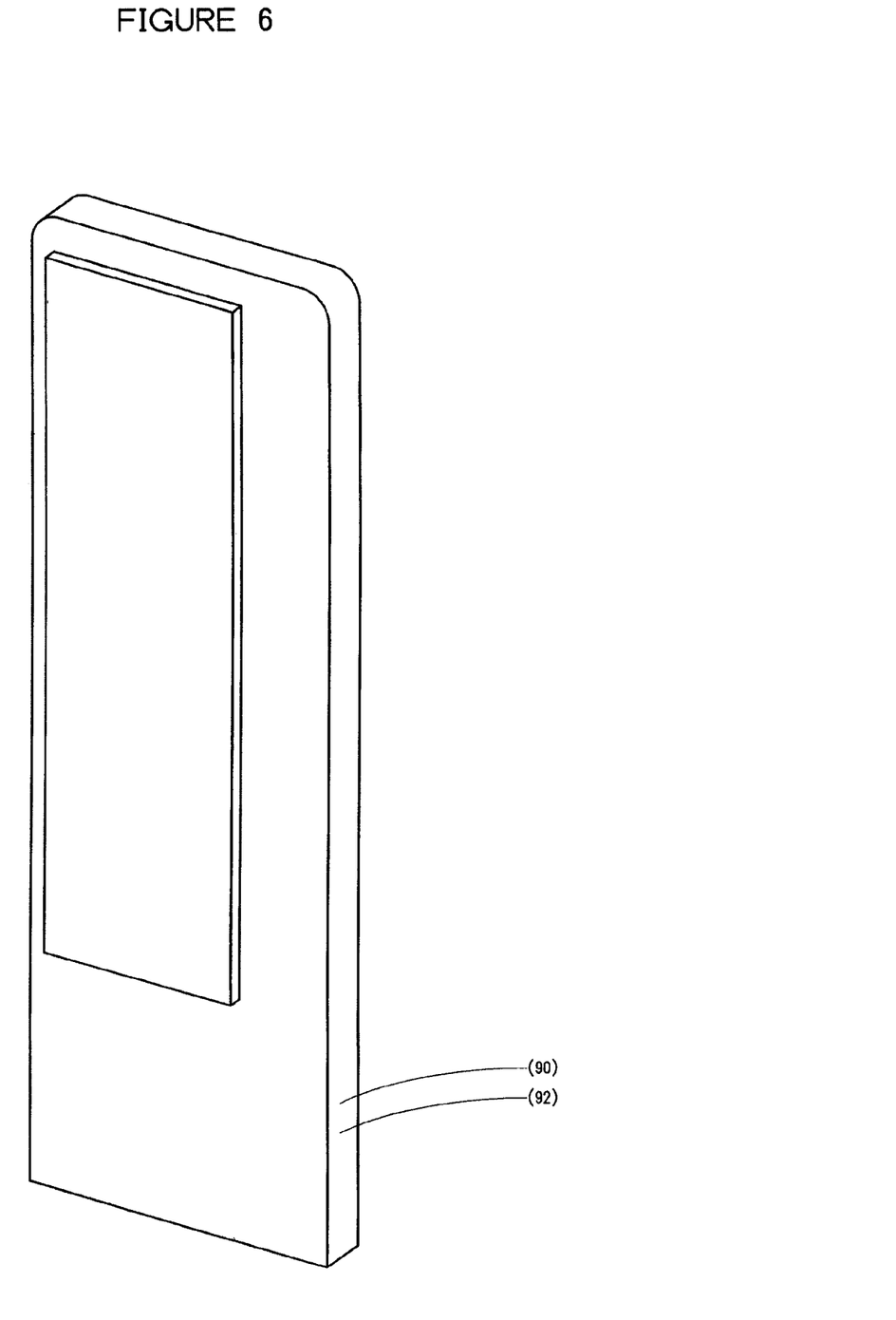
FIG. 6 is a schematic of the system controller of the present technology.

As shown in FIG. 6, the system controller includes a processor 90 and a computer readable storage medium (memory) 92, which includes instructions for the processor.

Figure 7:
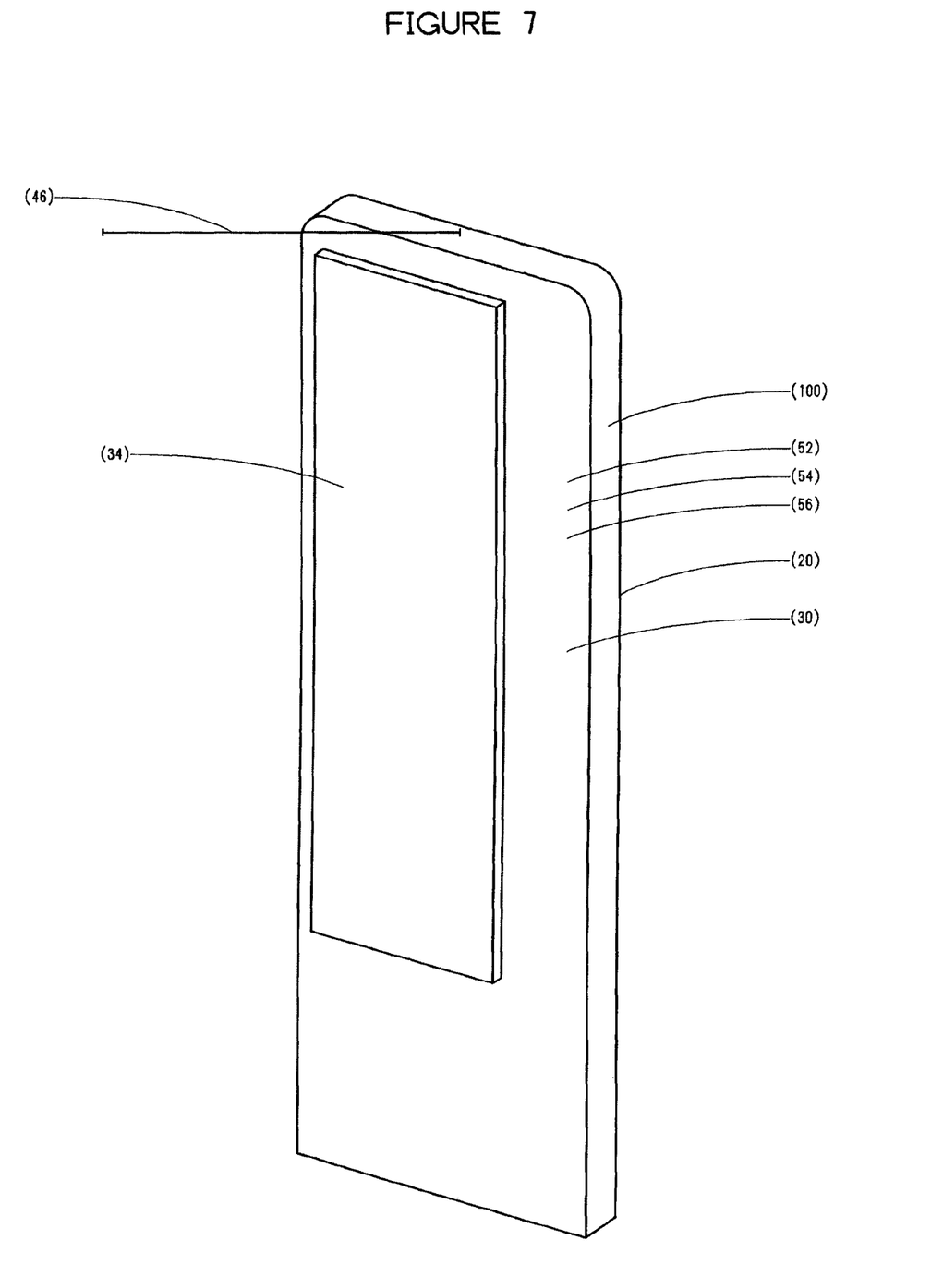
FIG. 7 is a schematic of the reflective sheet of the present technology.

As shown in FIG. 7, a reflective shield 100 is mounted between the detection system frame 26 and the media display frame 30. This shields the RF antenna 52, 54, 56 from interference from the screens 34, power supplies 80, power cords 82 and the like within the interference zone 44. The reflective material is aluminum, steel, stainless steel, galvanized metal, brass, bronze, or zinc. The material may be a thin layer, a foil, mesh, a coating or the like. If a mesh is used, the holes must be significantly smaller than the wavelength of the radiation to be blocked. The reflective material may be permanently or reversibly folded, pleated, corrugated, or ridged.

Figure 8:
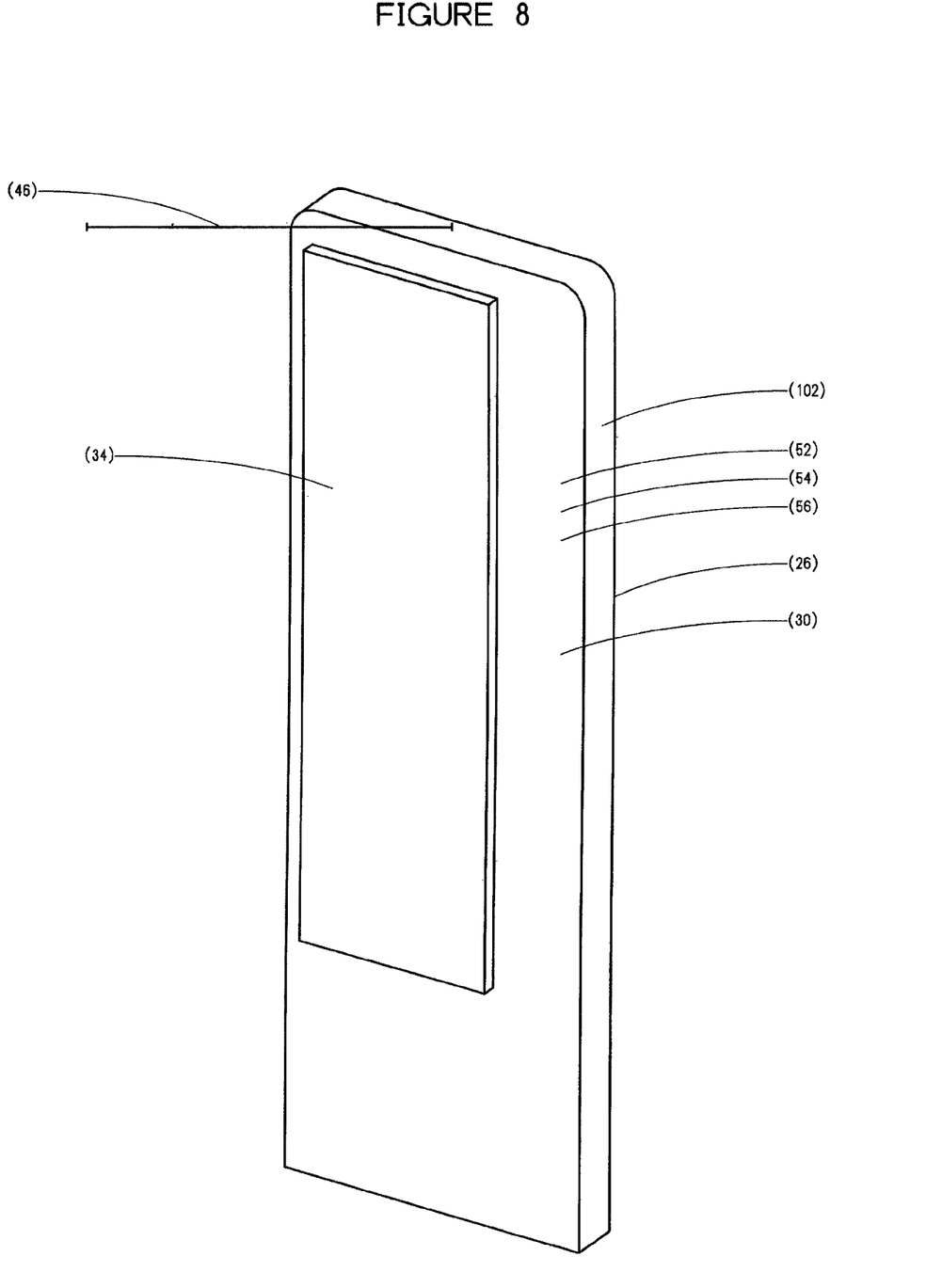
FIG. 8 is a schematic of the absorptive sheet of the present technology.

As shown in FIG. 8 an absorptive shield 102 is mounted between the detection system frame 26 and the media display frame 30. This shields the RF antenna 52, 54, 56 from interference from the screens 34, power supplies, power cords and the like within the interference zone 44. The absorptive shield 102 may be a protective shield against magnetic fields comprising peak saturation, soft, nickel-iron alloys including, for example, temperature compensator alloys Hy-Ra "49"®, HyMu 77®, HyMu 77®, HyMu "80"® ("MAGNETSHIELD™"), Hipernom®, HyMu "80" Mark II®, and HyMu "800"® and "800" A®, although any other suitable material may be used without departing from the invention. Alloys are provided in varying thickness from 0.004" to 0.062" with greater absorption generally observed at greater thicknesses, although similar thicknesses may vary in attenuation between different alloys and manufacturers, for example, between Peak Saturation Alloy MAGNETSHIELD™ (Less EMF Inc.) and HyMu "80"® (National Electronic Alloy Inc.) In general, greater thickness is also associated with small increases in weight per unit surface area and decreased pliability. In particularly preferred embodiments, the magnetic shields comprise 0.01-0.0154" National Electronic Alloys (also available from Less EMF Inc.) HyMu "80"® ("MAGNETSHIELD™") (also known as "Permalloy®", "HyMu "80"®", "MAG 7904®", "MIL N 14411 C®", "COMP. 1®" or "ASTM A753-78®") comprising 80% NI, 5% MO, 0.5% Si, 0.02% CU, and the remaining balance is Fe, with extremely peak initial and maximum permeability, very low coercive force and minimum hysteresis loss. In some embodiments, "MAGNETSHIELD™" is provided as a 4" wide foil 0.010" thick with peak magnetic saturation of 21400 G, and maximum permeability of 4000, and may be tin plated for excellent corrosion resistance and better conductivity. MAGNETSHIELD™ typically reduces fields up to a factor of 2 or 3 depending on size/shape of the shield. In some embodiments, for example to increase shielding to under 10 G permeability, two or more layers or laminates of shielding are provided. In further embodiments, the layer with strongest attenuation is provided nearest the magnetic field source. In particular embodiments, a second layer comprises a foil, for example, MAGNET SHIELDING FOIL™ (Less EMF Inc.). In other embodiments, one or more inter-layer spacers, for example ⅛ inch thick spacers are provided. In certain embodiments, multiple layers of peak saturation alloys are provided for enhanced attenuation in a single shield combining, for example, HyMu "80"® ("MAGNETSHIELD™") with JOINT-SHIELD™, MAG-STOP™ Plate, MAGNET SHIELDING FOIL™ and/or Metlas™. In preferred embodiments, the size, shape, and position of the magnetic shield are configured for optimal performance in a particular application. The size of the magnetic shield is determined based on the manufacturer's guidelines for the sensitive device, and determining the recommended safe distance for objects with magnets that produce peak gauss measurements to be from the device.

Copper and aluminum are preferred shields as they absorb both radio and magnetic waves. This shields the RF antenna 52, 54, 56 from interference from the screens 34, power supplies, power cords and the like within the interference zone 44. It similarly shields the screens 34 from interference from the RF antenna 52, 54, 56.

In some embodiments, the magnetic shields comprise GIRON™ Magnetic Shielding Film (Less EMF Inc.). GIRON™ does not contain nickel, is suitable for peak field strength applications requiring peak saturation and good permeability. GIRON™ is tolerant to bending or shaping without losing shielding properties. Provided as a woven, laminated material, GIRON™ may be fashioned with snips or sheet metal tools, and may be used either flat or molded into shapes as desired. In preferred embodiments, magnetic shields that comprise GIRON™ are coated with Plasti Dip®, injection molding, plastic or rubber to cover sharp edges.

In some embodiments, the magnetic shields comprise one or both of JOINT-SHIELD™ and MAG-STOP™ Plates (Magnetic Shield Co.), (also known as "MUMETAL®"). JOINT-SHIELD™ is a 0.010" thick, hydrogen-annealed magnetic shielding alloy with adhesive backing (rated 0-200° F.) on one side.

In some embodiments, magnetic shields are permanently or reversibly folded, pleated, corrugated, or ridged. In other embodiments, layers of superimposed magnetic shield alloys are configured geometric shapes that vary between one another in length, width, thickness and shape.

In some embodiments, magnetic shields are covered with a laminator using polyester film and an extruded heat seal adhesive. Thicker grades of 10 millimetres may add more protection. For example, a typical 10 millimetre thick film is constructed of 4/6 (film 4 millimetres thick and adhesive 6 millimetres thick). However, in some embodiments, 10 millimetres thick material may be constructed of 2/8 (8 millimetre adhesive) material or 7/3 (3 millimetres adhesive).

In alternative embodiments, the security tags 12 are Acoustomagnetic (AM), or Radio Frequency Identification (RFID) tags. Shielding is provided from EMI sources for the AM electronic article surveillance system at, for example, very low frequency (VLF=3 kHz-30 kHz), low frequency (LF=30 kHz-300 kHz), intermediate frequency (MF=300 kHz-3 MHz), and high frequency (HF 3 MHz-30 MHz). For example, certain acoustomagnetic systems use a transmitter that transmits a signal at 58 kHz in pulses. Swept-RF systems use a transmitter that transmits an RF signal between 7.4 and 8.8 MHz. Other electromagnetic systems use a transmitter that creates a low frequency (e.g., between 70 Hz and 1 kHz) electromagnetic field between two pedestals at exit areas.

A method of displaying electronic media on an EAS involves sending electronic media to the combination 10 and the electronic screen displaying the media. The media may be a static display or it may be streaming.

While the technology has been described in detail, such a description is to be considered as exemplary and not restrictive in character, and is to be understood that it is the presently preferred embodiments of the present technology and is thus representative of the subject matter which is broadly contemplated by the present technology, and that all changes and modifications that come within the spirit of the disclosure are desired to be protected.

The invention claimed is:

1. A system for streaming visual content to consumers, the system comprising an electronic media display, the electronic media display including an electronic screen and an at least one electrical line, the electrical line in electrical communication with a power supply and the electronic screen; an electronic article surveillance (EAS) detection system for use with a security tag and a system controller, the EAS including an emitter antenna and a receiver antenna or a transceiver; a base for retaining a power supply and each of the electronic media display and the EAS such that the electronic media display is within a detection zone; and a physical or electronic shield configured to shield the antennae or transceiver from the electronic screen.

2. The system of claim 1, wherein the shield is a physical shield.

3. The system of claim 2, wherein the physical shield is located between the antennae and both the at least one electronic screen and the at least one electrical line.

4. The system of claim 3, wherein the antennae are radio frequency (RF) antennae.

5. The system of claim 4, wherein the physical shield is a magnetic shield.

6. The system of claim 5, wherein the magnetic shield is a copper shield.

7. The system of claim 6, further comprising a system controller and an alarm, the system controller integrated into the base.

8. The system of claim 7, comprising a plurality of electronic screens.

9. The system of claim 8, wherein the plurality of electronic screens are liquid crystal display (LCD) screens.

10. The system of claim 1 wherein the shield is an electronic shield.

11. The system of claim 10, wherein the electronic shield is controlled by a processor under instructions from a memory.

12. A system for streaming consumer directed advertising, the system comprising: a media display, the media display including a plurality of LCD screens; an electronic article surveillance (EAS) detection system for use with an RF security tag, the EAS detection system including a transceiver or an emitter antenna and a receiver antenna, which together define a detection zone; a base for retaining a power supply, and housing a system controller and each of the media display and the EAS such that the media display is within the detection zone of the EAS; at least one electrical line in electrical communication with the power supply and the plurality of LCD screens; and a physical shield, the physical shield located between at least the plurality of LCD screens and the transceiver or both the emitter antenna and the receiver antenna of the EAS detection system.

* * * * *